(12) United States Patent
Rath

(10) Patent No.: US 11,468,232 B1
(45) Date of Patent: Oct. 11, 2022

(54) DETECTING MACHINE TEXT

(71) Applicant: SupportLogic, Inc., San Jose, CA (US)

(72) Inventor: Poonam Rath, San Jose, CA (US)

(73) Assignee: SupportLogic, Inc., San Jose, CA (US)

( * ) Notice: Subject to any disclaimer, the term of this patent is extended or adjusted under 35 U.S.C. 154(b) by 238 days.

(21) Appl. No.: 16/674,581

(22) Filed: Nov. 5, 2019

Related U.S. Application Data

(60) Provisional application No. 62/757,063, filed on Nov. 7, 2018.

(51) Int. Cl.
| | |
|---|---|
| *G06F 40/216* | (2020.01) |
| *G06K 9/62* | (2022.01) |
| *G06F 40/40* | (2020.01) |
| *G06F 40/284* | (2020.01) |
| *G06N 20/00* | (2019.01) |

(52) U.S. Cl.
CPC .......... *G06F 40/216* (2020.01); *G06F 40/284* (2020.01); *G06F 40/40* (2020.01); *G06K 9/6218* (2013.01); *G06K 9/6228* (2013.01); *G06N 20/00* (2019.01)

(58) Field of Classification Search
CPC ......... G06F 16/31; G06F 40/00; G06F 40/284
USPC ......................................................... 704/90
See application file for complete search history.

(56) References Cited

U.S. PATENT DOCUMENTS

| | | | |
|---|---|---|---|
| 6,832,205 B1 | 12/2004 | Aragones et al. | |
| 7,752,159 B2 * | 7/2010 | Nelken | G06F 40/30 |
| | | | 706/62 |
| 9,000,934 B1 | 4/2015 | Gordin et al. | |
| 9,466,299 B1 * | 10/2016 | Feltham | G10L 17/10 |
| 9,473,637 B1 | 10/2016 | Venkatapathy et al. | |
| 9,477,749 B2 * | 10/2016 | Mathew | G06F 40/237 |
| 9,678,817 B1 | 6/2017 | Hasbun Pacheco et al. | |
| 9,679,310 B1 * | 6/2017 | Saltzstein | G06F 3/043 |
| 10,679,008 B2 * | 6/2020 | Dubey | G06F 16/3347 |

(Continued)

OTHER PUBLICATIONS

Identifying Computer-Generated Text Using Statistical Analysis (Hoang Quoc) (Year: 2017).*

(Continued)

*Primary Examiner* — Akwasi M Sarpong

(74) *Attorney, Agent, or Firm* — Todd A. Noah; Dergosits & Noah LLP

(57) ABSTRACT

System receives historical text block, creates historical features for historical text block's historical text lines. System trains machine-learning model to cluster historical features into historical features clusters based on their similarities. System identifies historical features cluster as historical human text cluster. System classifies each historical text line for historical human text cluster as human text, and each historical text line for other historical features clusters as machine text. System receives text block, creates features for text block's text lines. System applies trained machine-learning model to cluster features into features clusters based on their similarities. System identifies features cluster as human text cluster. System classifies each text line for human text cluster as human text, and each text line for other features clusters as machine text. System applies human text analysis to each text line classified as human text and machine text analysis to each text line classified as machine text.

20 Claims, 8 Drawing Sheets

(56) References Cited

U.S. PATENT DOCUMENTS

| | | | |
|---|---|---|---|
| 11,074,412 B1* | 7/2021 | Leeman-Munk | G06N 3/08 |
| 2003/0046250 A1 | 3/2003 | Kuettner et al. | |
| 2009/0319270 A1* | 12/2009 | Gross | G10L 17/04 |
| | | | 704/246 |
| 2010/0157340 A1* | 6/2010 | Chen | G06V 30/413 |
| | | | 358/1.9 |
| 2010/0198635 A1 | 8/2010 | Pirtle et al. | |
| 2012/0143564 A1 | 6/2012 | Li et al. | |
| 2013/0019163 A1* | 1/2013 | Thompson | G06F 17/00 |
| | | | 715/234 |
| 2013/0024407 A1* | 1/2013 | Thompson | G06F 40/253 |
| | | | 706/12 |
| 2013/0268262 A1 | 10/2013 | Moilanen et al. | |
| 2014/0188457 A1 | 7/2014 | Fink et al. | |
| 2014/0245075 A1 | 8/2014 | Dhoolia et al. | |
| 2015/0052002 A1* | 2/2015 | Welch | G06F 16/353 |
| | | | 705/26.7 |
| 2015/0052127 A1* | 2/2015 | Welch | G06F 16/35 |
| | | | 707/727 |
| 2015/0254687 A1 | 9/2015 | Konopka et al. | |
| 2015/0254689 A1 | 9/2015 | Amemiya | |
| 2016/0098480 A1 | 4/2016 | Nowson | |
| 2017/0242919 A1 | 8/2017 | Chandramouli et al. | |
| 2018/0131559 A1 | 5/2018 | Tapia et al. | |
| 2018/0276061 A1 | 9/2018 | An et al. | |
| 2019/0213605 A1 | 7/2019 | Patel et al. | |
| 2020/0004434 A1 | 1/2020 | Borlick et al. | |
| 2020/0061294 A1* | 2/2020 | Pounds | A61J 1/201 |
| 2020/0125639 A1* | 4/2020 | Doyle | G10L 15/197 |
| 2020/0126533 A1* | 4/2020 | Doyle | G10L 15/1815 |
| 2020/0142999 A1* | 5/2020 | Pedersen | G06K 9/6263 |

OTHER PUBLICATIONS

Identifying Computer Generated Text Using Statistical Analysis, Hoang-Quoc Nguyen-Son (Year: 2017).*

Office Action dated Sep. 25, 2020, from related U.S. Appl. No. 16/352,692.

Office Action dated Mar. 1, 2021, from related U.S. Appl. No. 16/512,638.

* cited by examiner

100

I tried to remote mount the file system /usr/src from the server host 2 and got the following:

nfs_mount: illegal file system name src, use host: pathname

I need your help!
Your mount command did not correctly specify the name of the server. Please enter the following command:
\# mount host2:/usr/src/host2/usr/src

| Text Line # | # characters | # numerical | # uppercase | # space | # punctuation |
|---|---|---|---|---|---|
| 1 | 94 | 1 | 1 | 17 | 3 |
| 2 | 0 | 0 | 0 | 0 | 0 |
| 3 | 59 | 0 | 0 | 4 | 3 |
| 4 | 0 | 0 | 0 | 0 | 0 |
| 5 | 17 | 0 | 1 | 4 | 1 |
| 6 | 105 | 0 | 2 | 17 | 2 |
| 7 | 37 | 2 | 0 | 3 | 7 |

| Text Line # | % numerical | % uppercase | % space | % punctuation |
|---|---|---|---|---|
| 1 | 1 | 1 | 18 | 3 |
| 2 | 0 | 0 | 0 | 0 |
| 3 | 0 | 0 | 7 | 5 |
| 4 | 0 | 0 | 0 | 0 |
| 5 | 0 | 6 | 24 | 6 |
| 6 | 0 | 2 | 16 | 2 |
| 7 | 5 | 0 | 8 | 19 |

I was trying to perform a remote mount and received the following error message:
nfs_mount: host2 not responding: rpc prog not registered
Your mount command got to the port mapper, but the nfs mountd daemon was not registered. Log in to the server and use the ls command to verify that the /usr/sbin/mountd file exists. If this file exists, use the ps command to verify that the mountd daemon is running. If this daemon is not running, restart it by entering the following command:
/usr/sbin/mountd
Please let me know if you need more help.

| Text Line # | # characters | # numerical | # uppercase | # space | # punctuation |
|---|---|---|---|---|---|
| 1 | 80 | 0 | 1 | 13 | 1 |
| 2 | 56 | 1 | 0 | 7 | 3 |
| 3 | 346 | 0 | 4 | 64 | 9 |
| 4 | 19 | 0 | 0 | 2 | 4 |
| 5 | 41 | 0 | 1 | 8 | 1 |

| Text Line # | % numerical | % uppercase | % space | % punctuation |
|---|---|---|---|---|
| 1 | 0 | 1 | 16 | 1 |
| 2 | 2 | 0 | 13 | 5 |
| 3 | 0 | 1 | 18 | 3 |
| 4 | 0 | 0 | 11 | 21 |
| 5 | 0 | 2 | 20 | 2 |

FIG. 2C

DETECTING MACHINE TEXT

CROSS REFERENCE TO RELATED APPLICATION

This application claims priority under 35 U.S.C. § 119 or the Paris Convention from U.S. Provisional Patent Application 62/757,063, filed Nov. 7, 2018, the entire contents of which is incorporated herein by reference as if set forth in full herein.

BACKGROUND

The types of text stored by computer systems include text that is 100% natural language text, such as word processor documents that are read by humans, and text that is 0% natural language text, such as machine language instructions that are interpreted by computers. Computer systems use Natural Language Processing (NLP) to analyze text, extract signals from the analyzed text, infer meaning from the extracted signals, and extensively leverage such techniques in a wide variety of different environments and products. However, this natural language processing analysis becomes more complicated when the text of interest includes "human text" interleaved with "machine text." Human text can be a set of characters in which a majority of the characters combine to form natural language elements, such as natural language words, abbreviations, and acronyms. While human text is typically generated by a person, human text may be generated by a machine, such as an artificial intelligence-based chatbot. Machine text can be a set of characters in which a minority of the characters combine to form natural language elements. While machine text is typically generated by a machine such as a computer, machine text may be generated by a human, such as a technical support agent who has memorized specific machine text commands. Machine text includes, but is not limited to, application logs, error messages, stack traces, JavaScript Object Notation (JSON) configurations, code samples, code fragments, command-line arguments, and machine related configuration information.

In an example illustrating human text and machine text, an end user of a software product experiences a problem using the software product and submits a technical support ticket. A technical support agent receives the technical support ticket and responds to the end user, creating a thread of back-and-forth text messages between the technical support agent and the end user for the troubleshooting case. This troubleshooting process typically starts with the end user generating a human text message that describes the problem and sharing any machine texts that the end user received, such as an application log message or error message. During the back-and-forth text messages, the technical support agent may request that the end user try a different approach or execute a particular set of commands and share any results with the technical support agent. Therefore, the thread of back-and-forth text messages between the end user and the technical support agent includes human text interleaved with machine text.

A computer system may use natural language processing to analyze the content of the back-and-forth text messages between the user and the technical support agent. If the computer system applies this content analysis to determine customer sentiment, this content analysis should exclude the machine text. Application log messages and error messages frequently include terms such as "failure," "critical," "waiting," and "no response," such that the content analysis of these types of machine text could considerably distort the perceived customer sentiment of the back-and-forth text messages between the end user and the technical support agent.

Although the analysis of customer sentiment should exclude machine text, a computer system can use machine text provided by different end users to analyze customers' troubleshooting cases for a specific software product. A computer system can track machine text over the course of a single user's troubleshooting case to accurately diagnose the central issue and monitor the health of the case over the lifespan of the case. Consequently, software companies may manually label machine text to separate machine text from human text, and then separately analyze each type of text. This manual labeling of machine text is a labor-intensive and time-consuming process which does not scale when applied to increasingly large amounts of text. Once the machine text is manually labeled, a typical computer system may train to detect regular expressions to identify specific patterns of machine text, such as detecting the words "error" or "warning" within application log messages. These rules-based computer systems that train to label machine text tend to be inflexible and rigid in the way they assign labels to machine text, such as mislabeling an end user's human text about an "error" or a "warning," thereby labeling this human text as machine text.

BRIEF DESCRIPTION OF THE DRAWINGS

FIGS. 1A-D illustrate block diagrams of example training data structures for detecting machine text, under an embodiment;

FIGS. 2A-D illustrate block diagrams of example production data structures for detecting machine text, under an embodiment;

DETAILED DESCRIPTION

A computer system can measure statistical differences between human text and machine text on a variety of linguistic axes. While research literature includes discussions of these linguistic differences that could be used to classify text, such a text classification technique would involve a laborious process to determine the appropriate cutoffs to use depending on the desired output. Such a technique would require a large quantity of labeled data for training the text classifier, and also have a high probability of misclassifying text that is at or close to the decision boundary.

Embodiments herein enable detecting machine text. A system receives a block of historical text and creates a corresponding set of historical features for historical text lines within the block of historical text. The system trains a machine-learning model to cluster the sets of historical features into clusters of historical features based on similarities within the sets of historical features. The system identifies a cluster of historical features as corresponding to human text. The system classifies each historical text line that corresponds to the identified cluster of historical features as human text, and/or each historical text line that corresponds to another cluster of historical features as machine text. The system receives a block of text and creates a corresponding set of features for text lines within the block of text. The system applies the trained machine-learning model to cluster the sets of features into clusters of features based on similarities within the sets of features. The system identifies a cluster of features as corresponding to human text. The system classifies each text line that corresponds to the identified cluster of features as human text, and/or each text line that corresponds to another cluster of features as machine text. The system applies human text analysis to each text line classified as human text and/or machine text analysis to each text line classified as machine text.

Figure 1D:
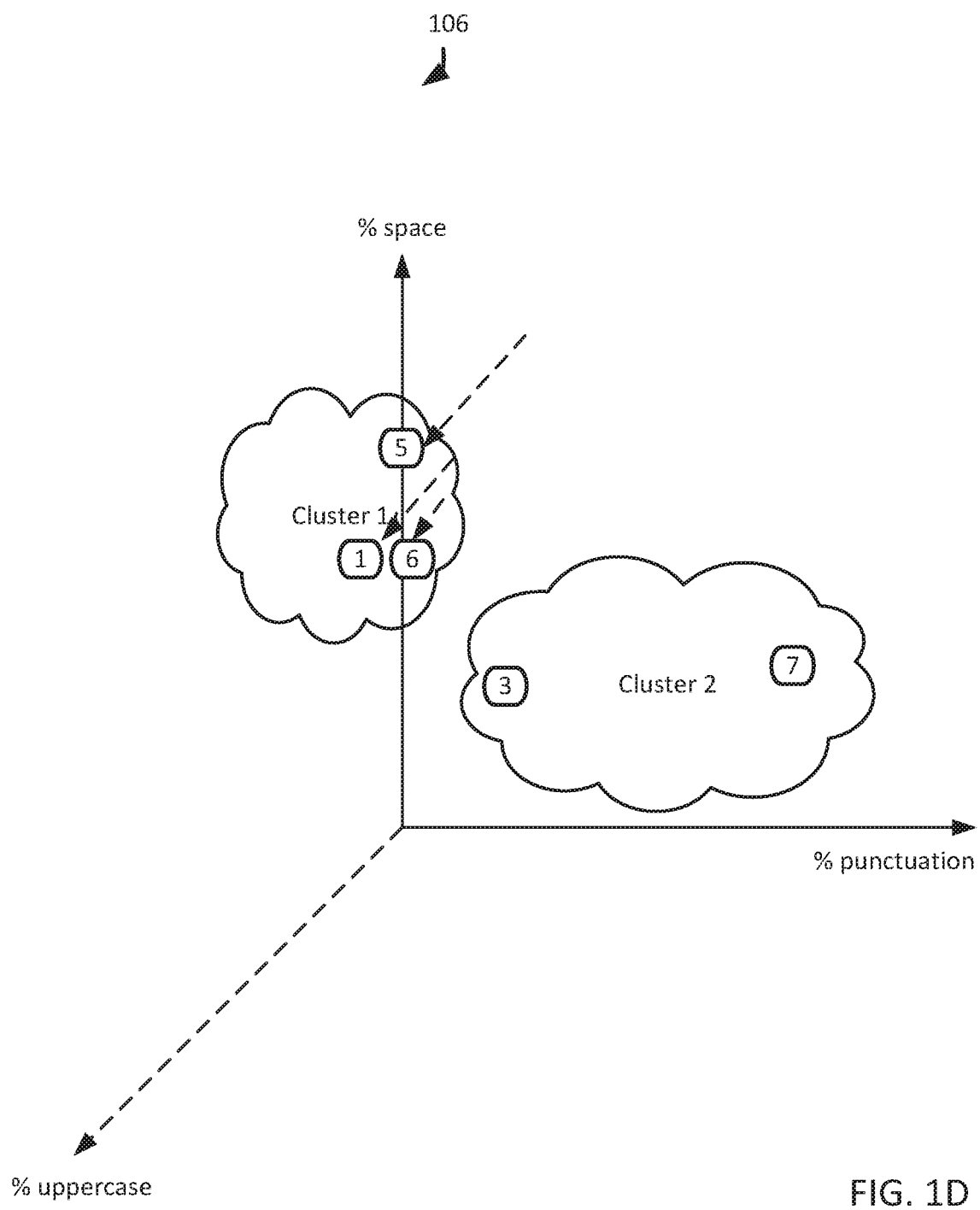

For example, a training server receives a block of text 100 concerning a remote mount problem, as depicted by FIG. 1A. The training server creates sets of features 102 for text lines within the block, in which the sets of features 102 indicate a count of 94 characters that include 17 spaces in the first text line, as depicted by FIG. 1B, and normalizes these sets of features 102 in a features matrix 104, which indicates that 18% of the first text line's characters are spaces, as depicted by FIG. 1C. The training server trains a machine-learning model to cluster the features in the features matrix 104 into clusters of features based on similarities of the features, as partially illustrated by the graph 106 depicted by FIG. 1D. The training server identifies cluster number 1 as having human text features, classifies the first, fifth and sixth text lines that correspond to cluster number 1 as human text, and classifies the third and seventh text lines that correspond to the remaining cluster number 2 as machine text.

Figure 2D:
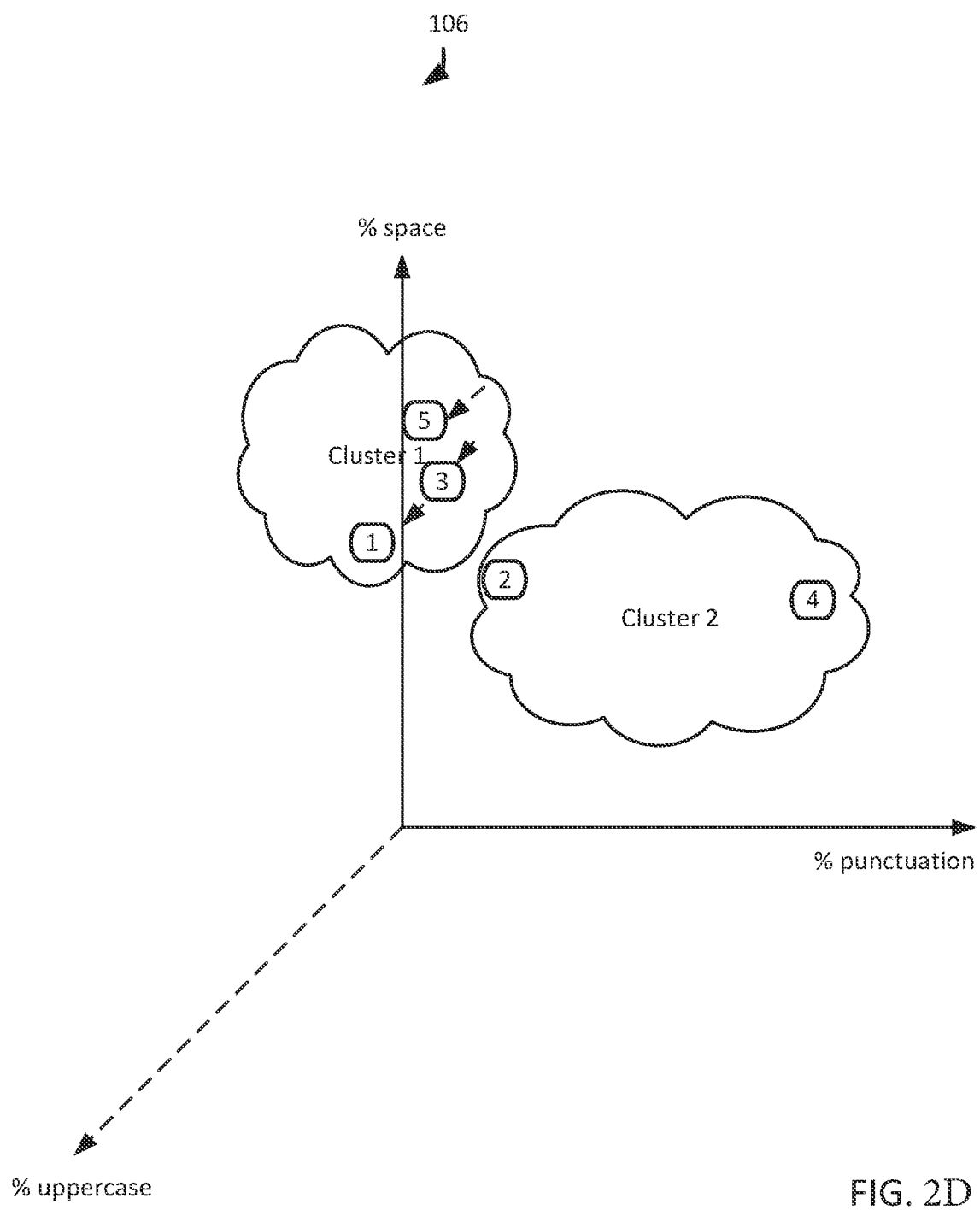

A production server receives a current block of text 200 concerning a different remote mount problem, as depicted by FIG. 2A. The production server creates sets of features 202 for text lines within the block of text 200, in which the sets of features 202 indicate a count of 80 characters that include 13 spaces in the first text line, as depicted by FIG. 2B, and normalizes these features in a features matrix 204, which indicates that 16% of the first text line's characters are spaces, as depicted by FIG. 2C. The production server applies the trained machine-learning model to cluster the features in the features matrix 204 into clusters of features based on similarities of the features, as partially illustrated by the graph 206 depicted by FIG. 2D. The production server identifies cluster number 1 as having human text features, classifies the first, third, and fifth text lines that correspond to cluster number 1 as human text, and classifies the second and fourth text lines that corresponds to the remaining cluster number 2 as machine text. Then production server analyzes the first, third, and fifth text lines as human text and analyzes the second and fourth text lines as machine text.

Figure 3:
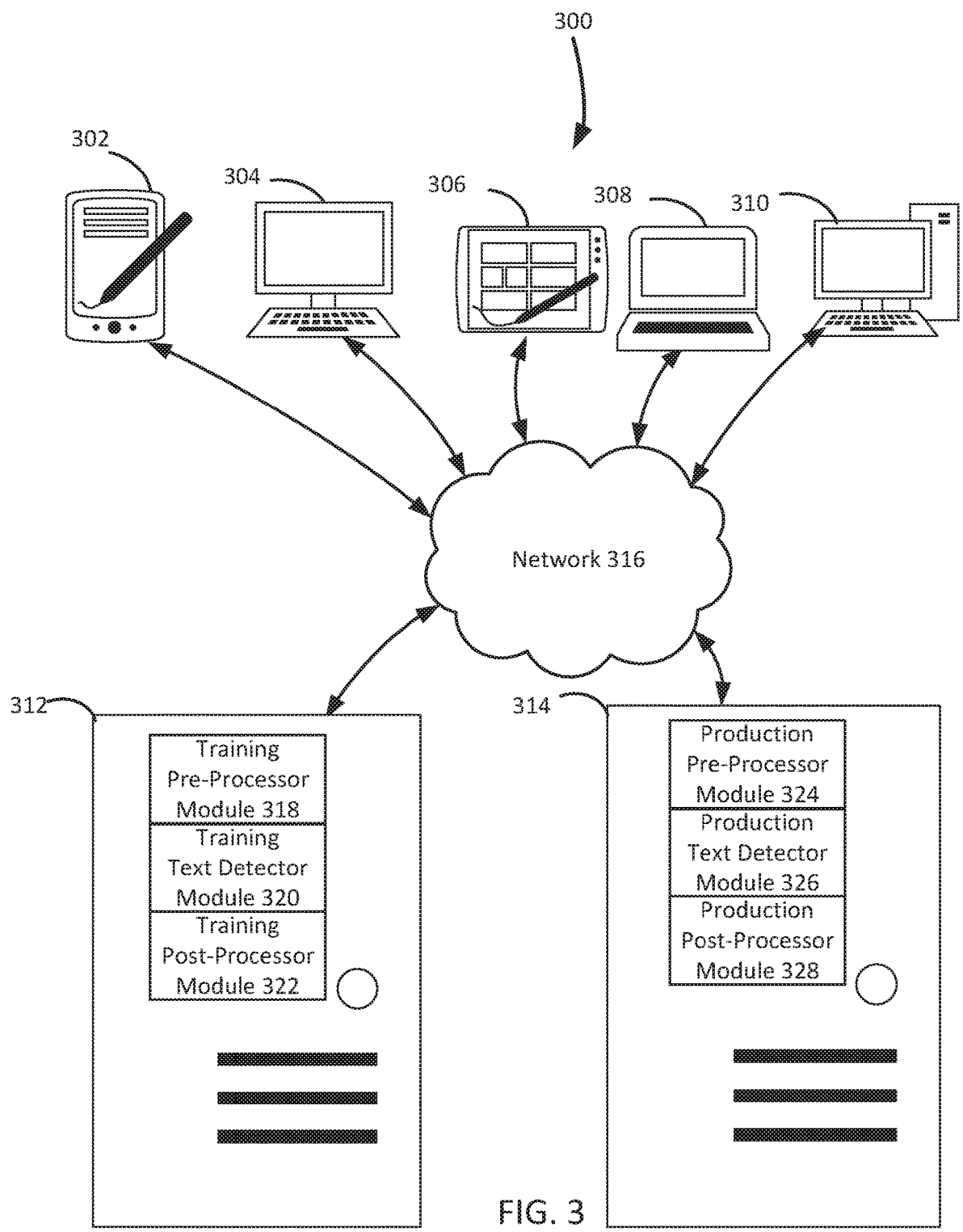
FIG. 3 illustrates a block diagram of an example system for detecting machine text, under an embodiment.

FIG. 3 illustrates a block diagram of an example system 300 for detecting machine text, under an embodiment. As shown in FIG. 3, the system 300 may illustrate a cloud computing environment in which data, applications, services, and other resources are stored and delivered through shared data centers and appear as a single point of access for the end users. The system 300 may also represent any other type of distributed computer network environment in which servers control the storage and distribution of resources and services for different client users.

In an embodiment, the system 300 represents a cloud computing system that includes a first client 302, a second client 304, a third client 306, a fourth client 308, a fifth client 310; and a first server 312 and a second server 314 that may be provided by a hosting company. The clients 302-310 and the servers 312-314 communicate via a network 316. The first server 312 may be referred to as the training server 312, and the second server 314 may be referred to as the production server 314. The training server 312 can include a training pre-process module 318, a training text detector module 320, and a training post-process module 322; and the production server 314 can include a production pre-process module 324, a production text detector module 326, and a production post-process module 328.

Even though FIG. 3 depicts the first client 302 as a smartphone 302, the second client 304 as a terminal 304, the third client 306 as a tablet computer 306, the fourth client 308 as a laptop computer 308, the fifth client 310 as a personal computer 310, and the servers 312-314 as servers 312-314, each of the system components 302-316 may be any type of computer system. The system elements 302-314 may each be substantially similar to the hardware device 500 depicted in FIG. 5 and described below. While FIG. 3 depicts the system 300 with five clients 302-310, two servers 312-314, one network 316, two pre-process modules 318 and 324, two text detector modules 320 and 326, and two post-process modules 322 and 328, the system 300 may include any number of clients 302-310, any number of servers 312-314, any number of networks 316, any number of pre-process modules 318 and 324, any number of text detector modules 320 and 326, and any number of post-process modules 322 and 328. Although FIG. 3 depicts all of the training modules 318-322 residing completely on the training server 312, any or all of the training modules 318-322 may reside completely on the production server 314, or in any combination of partially on the training server 312, partially on the production server 314, partially on the clients 302-310, such as by residing as data management applications on the clients 302-310, and partially on another server which is not depicted in FIG. 3. While FIG. 3 depicts all of the production modules 324-328 residing completely on the production server 314, any or all of the production modules 324-328 may reside completely on the, or in any combination of partially on the production server 314, partially on the training server 312, partially on the clients 302-310, such as by residing as data management applications on the clients 302-310, and partially on another server which is not depicted in FIG. 3. After training to detect machine text, the system 300 may be referred to as the trained system 300.

The system 300 may be initialized without human supervision, because labelled text is not required. The training server 312 can randomly sample any block of historical text, train a machine-learning model to cluster the features of text lines in the sampled block into clusters of features, and use one technique to identify each cluster of features as either a human text cluster or a machine text cluster, and then use other techniques of identifying each cluster of features as a human text cluster or a machine text cluster as a verification that the clusters of features have been correctly identified as a human text cluster or a machine text cluster.

The training server 312 receives a block of historical text. For example, the training pre-processor module 318 receives the block of text 100, that concerns a remote mount problem and is depicted by FIG. 1A, which includes historical human text that is interleaved with historical machine text. The block of historical text 100 may include any number of application logs, error messages, stack traces, JSON configurations, code samples, code fragments, command-line arguments, and/or machine related configuration information from any time period. The amount of historical text is selected to provide sufficient data points so that the training server 312 can automatically learn to distinguish between human text and machine text. The machine text that is used to initialize the training server 312 is not even required to correspond to the exact domain into which the production server 312 is to be deployed. A block can be an amount of text that is processed as a unit. Historical text can be data that is in the form of characters and associated with the past.

After receiving a block of historical text, the training server 312 can identify delimiters in the block of historical text. For example, the training pre-processor module 318 identifies newline characters in the block of text 100 depicted by FIG. 1A. Following the identification of the delimiters, the training pre-processor module 318 can split the block of historical text, at the delimiters, into a set of historical text lines. For example, the training pre-processor module 318 splits the block of text 100 into seven text lines. The first text line is "I tried to remote mount the file system /usr/src from the server host 2 and got the following:" the second text line is blank, the third text line is "nfs_mount: illegal file system name xxx, use host: pathname," the fourth text line is blank, and the fifth text line is "I need your help!" The sixth text line is "Your mount command did not correctly specify the name of the server. Please enter the following command:" and the seventh text line is "# mount host2:/usr/src/host2/usr/src." A delimiter can be a blank space, comma, or other character or symbol that indicates the beginning or end of a character string. A set can be a group of things that are associated together. A historical text line can be a horizontal sequence of data that is in the form of characters and is associated with the past.

Having split the block of historical text into a set of historical text lines, the training pre-processor module 318 can determine whether any historical text line in the set of historical text lines is any type of excluded content. The training server 312 can use any appropriate form of entropy measurement, such as Shannon entropy with a threshold cutoff, to determine whether any of the historical text lines is a type of excluded content. For example, the training pre-processor module 318 identifies the second text line and the fourth text line as low information lines that are blank lines. After determining whether any historical text line in the set of historical text lines is any type of excluded content, the training server 312 can delete any historical text lines that are determined to be any type of excluded content from the set of historical text lines. For example, the training pre-processor module 318 deletes the second text line and the fourth text line from the set of text lines to be processed because these two text lines are blank lines. A type of excluded content can be a low information text line, such as a blank line, a white-spaced line, or a text line that includes repeated characters.

The training process starts by the training server 312 creating a corresponding set of historical features for each historical text line in the set of historical text lines. These historical features include, but are not limited to, the number of numerical characters in a historical text line, the number of uppercase characters in the historical text line, the number of space characters in the historical text line, and the number of punctuation characters in the historical text line. For example, the training text detector module 320 receives the set of historical text lines, and then creates the sets of features 102 that are depicted by FIG. 1B. The sets of features 102 indicate that the first text line has 94 characters, which include 1 numerical character, 1 uppercase character, 17 space characters, and 3 punctuation characters, the second line has 0 characters other than a newline character, the third line has 59 characters, which include 0 numerical characters, 0 uppercase characters, 4 space characters, and 3 punctuation characters, and the fourth line has 0 characters other than a newline character. In embodiments in which the training text detector module 320 deletes low information lines, the set of features 102 would not include any features for the second text line or the fourth text line. The sets of features 102 also indicate that the fifth text line has 17 characters, which include 0 numerical characters, 1 uppercase character, 4 space characters, and 1 punctuation character, the sixth line has 105 characters, which include 0 numerical characters, 2 uppercase characters, 17 space characters, and 2 punctuation characters, and the seventh line has 37 characters, which include 2 numerical characters, 0 uppercase characters, 3 space characters, and 7 punctuation characters. A historical feature can be a distinctive attribute of something that is associated with the past.

Following the creation of sets of historical features, the training text detector module 320 can create a historical features matrix by normalizing each set of historical features based on a total number of characters in the corresponding historical text line. The historical features matrix includes a row for each historical text line and a column for each historical feature in the set of historical features. For example, the training text detector module 320 creates the features matrix 104 that is depicted by FIG. 1C. The features matrix 104 indicates that the first text line has 1% numerical characters, 1% uppercase characters, 18% space characters, and 3% punctuation characters, the second line has 0% of any characters other than a newline character, the third line has 0% numerical characters, 0% uppercase characters, 7% space characters, and 5% punctuation characters, and the fourth line has 0% of any characters other than a newline character. In embodiments in which the training text detector module 320 deletes low information lines, the features matrix 104 would not include any normalized features for the second text line or the fourth text line. The features matrix 104 also indicates that the fifth text line has 0% numerical characters, 6% uppercase character, 24% space characters, and 6% punctuation character, the sixth line has 0% numerical characters, 2% uppercase characters, 16% space characters, and 2% punctuation characters, and the seventh line has 5% numerical characters, 0% uppercase characters, 8% space characters, and 19% punctuation characters. A total number can be an arithmetical value representing the whole amount of a particular quantity that is used in counting and making calculations. A character can be a symbol.

Having created a historical features matrix, the training server 312 trains a machine-learning model to apply a machine-learning technique to the historical features matrix, thereby clustering the sets of historical features corresponding to each historical text line into clusters of historical features based on similarities within the sets of historical features. The machine-learning technique may be a clustering algorithm implemented as a distance-based technique, such as a K-Means clustering algorithm or a Dbscan clustering algorithm. For example, the training text detector module 320 applies an K-Means clustering algorithm to the features matrix 104, which clusters the features in the features matrix 104 into clusters of features based on similarities of the features, as partially illustrated by the graph 106 depicted by FIG. 1D. The reason that the graph 106 only partially illustrates the clustering of the features in the features matrix 104 is because the graph 106 has only three axes, a % uppercase axis, a % space axis, and a % punctuation axis, whereas a full illustration of the clusters of features would also require a fourth axis for % numerical.

However, understanding three types of features that are measured along three axes that represent three dimensions in a black and white image on a two dimensional piece of paper is challenging enough for a reader, such that the addition of a fourth type of feature that is measured along a fourth axis that represents a fourth dimension may result in an image that is virtually impossible for the reader to understand. A machine-learning model can be an application of artificial intelligence that provides a system with the ability to automatically learn and improve from experience without being explicitly programmed. A cluster can be a group of similar things positioned closely together. A similarity can be a resemblance.

After the sets of historical features corresponding to each historical text line are clustered into clusters of historical features, the training text detector module 320 assigns a unique cluster identifier to each cluster of historical features and to each corresponding historical text line. For example, the training text detector module 320 creates a cluster of features that includes the features in the features matrix 104 for the first text line, the fifth text line, and the sixth text line, and then assigns the cluster number 1 to this cluster and to the first text line, the fifth text line, and the sixth text line. In another example, the training text detector module 320 creates a cluster of features that includes the features in the features matrix 104 for the third text line and the seventh text line, and then assigns the cluster number 2 to this cluster and to the third text line and the seventh text line.

In the example of the graph 106 depicted by FIG. 1D, the features for the third text line may superficially appear to be relatively close to the features for the first text line, the fifth text line, and the sixth text line. However, when the training text detector module 320 learns to create clusters of features, the frequent presence of uppercase characters in human text features and the frequent absence of uppercase characters in machine text features teaches the training text detector module 320 to cluster the features for the third text line with the features for the seventh text line instead of clustering the features for the third text line with the features for the first text line, the fifth text line, and the sixth text line.

Following the assignment of a unique cluster identifier to each cluster of historical features and to each corresponding historical text line, the training text detector module 320 identifies at least one of the clusters of historical features as corresponding to human text. This identification may be achieved in any of the following ways.

The training text detector module 320 can identify the cluster of historical features that correspond to the largest number of historical text lines as corresponding to human text. For example, the training text detector module 320 identifies cluster number 1 that corresponds to three of the five historical text lines as corresponding to human text because the majority of the historical text lines in typical blocks of text for technical support tickets is human text. A largest number can be an arithmetical value representing the relatively greatest amount of a particular quantity that is used in counting and making calculations.

Alternatively, the training text detector module 320 can apply the machine learning model to the features of known human text lines to temporarily update the clusters of historical features and then identify the temporarily updated cluster of historical features to which the largest number of the features of these known human text lines were clustered as the cluster of historical features that corresponds to human text. For example, the training text detector module 320 applies the K-means clustering algorithm to the known human text line "This is a test," and then identifies that the features for "This is a test." would have been clustered to cluster number 1, which infers that cluster number 1 corresponds to human text. Since the features for the known human text lines were clustered only for the purposes of identifying (or verifying) which cluster corresponds to human text, the clusters are only temporarily updated, such that the features for the known human text line is not retained by the clusters and the known human text line is not used for subsequent human text analysis. A known human text line can be a horizontal sequence of be data that is in the form of characters and is identified as natural language.

The training text detector module 320 can identify a cluster of historical features as corresponding to human text by examining proportions of human words corresponding to each cluster of historical features, and then identifying the cluster of historical features that corresponds to the largest proportion of human words as corresponding to human text. For example, the training text detector module 320 examines the proportions of common human words such as "I" and "your," which were sampled from a Basic English vocabulary, in cluster number 1 and cluster number 2, and then identifies cluster number 1 which corresponds to two instances of "I" and two instances of "your" as corresponding to human text, because cluster number 1's proportion is 10% common human words based on a proportion of four common human words to thirty-nine total words. In contrast, the training text detector module 320 identifies cluster number 2 which does not correspond to either "I" or "your" as corresponding to machine text, because cluster number 2's proportion is 0% common human words based on a proportion of no common human words to twelve total words. A proportion can be a part considered in comparative relation to a whole. A largest proportion can be the relatively greatest sized part considered in comparative relation to a whole. A human word can be a natural language element.

Having identified all clusters of historical features that correspond to human text, the training text detector module 320 classifies each historical text line that corresponds to the identified cluster of historical features as human text, and/or each historical text line that corresponds to another one of the clusters of historical features as machine text. For example, the training text detector module 320 classifies the first text line, the fifth text line, and the sixth text line as human text because the first text line, the fifth text line, and the sixth text line correspond to cluster number 1 that has been identified as corresponding to human text. In another example, the training text detector module 320 classifies the third text line and the seventh text line as machine text because the third text line and the seventh text line correspond to cluster number 2 that has not been identified as corresponding to human text.

In addition, the training server 312 enables multiple ways for configurable stringency in determining whether or not a historical text line is classified as machine text. For example, the training text detector module 320 can compute the distance of all sets of historical features, for all historical text lines which are classified as machine text, from the centroid(s) of the historical human text cluster(s) and the distance of the same sets of historical features from the centroid(s) of the historical machine text cluster(s). The training server 312 can confirm that a subset of historical text lines which correspond to sets of historical features that are closer than a pre-specified threshold distance from the centroid(s) of the historical machine text cluster(s) were correctly classified as machine text. However, if a historical text line corresponds to a set of historical features that is an outlier which is only marginally closer to a centroid of the historical machine text cluster(s) than to a centroid of the historical human text cluster(s), the historical text line could be classified as either machine text or human text, depending on the configurations by a system administrator. Consequently, a system administrator can configure whether a historical text line will be classified as machine text or human text if the distances of the historical text line's set of features to both types of centroids are within a distance threshold.

The training server 312 can classify a wide variety of machine text that includes application logs, error messages, stack traces, JSON configurations, code samples, code fragments, command-line arguments, and machine related configuration information. While diverse machine texts are relevant in assessing case health along different axes, highlighting all of the types of machine text may not be relevant to all members of a technical support organization. Accordingly, specific historical text lines that are classified as machine text may be reclassified by a system administrator as human text if needed. In this situation, the training server 312 can receive a whitelist that identifies specific types of historical text lines, which would have been classified as machine text, and then reclassify the specified types of historical text lines as human text. The system administrator can subsequently instruct the training server 312 to remove certain reclassifications from the whitelist or add other specific reclassifications to the whitelist, and then retrain the training text detector module 320 to ensure classification of various types of historical text lines in the manner desired by the system administrator. The training pre-processor module 318 can also apply the whitelist.

After the training text detector module 320 classifies each historical text line as either human text or machine text, rather than just outputting these classification results, the training post-processor module 322 can identify contiguous historical text lines that are classified as machine text and then use the start and stop characters for these contiguous historical text lines in the block of historical text when outputting the historical text. However, real-world environments frequently provide complications. For example, two blocks of historical text that are classified as machine text may be separated by an empty historical text line or by a historical text line that is classified as historical human text. In situations when two disjoint blocks of historical machine text are from different sources of machine text, or when the intervening historical text line is actually human text, combining the blocks of historical machine text may not be desirable. In scenarios when the intervening historical text line between two blocks of historical machine text is misclassified as human text, the training post-processor module 322 should combine the two blocks of historical machine text with the misclassified intervening historical text line.

For such scenarios, the training post-processor module 322 builds blocks of historical machine text from contiguous or nearly contiguous historical text lines, by taking a wider view of the output from the training text detector module 320, and making a determination as whether to merge the blocks of historical text classified as machine text that are interleaved with historical text lines misclassified as historical human text or to keep the blocks of historical machine text separate. When two blocks of historical text are classified as machine text and are separated by one, a couple, or a few intervening historical text lines that are classified as human text, the training post-processor module 322 can apply additional scrutiny to these intervening historical text lines to increase the confidence that these intervening historical text lines should be classified as human text. The training post-processor module 322 can compare the distance from an intervening text line's historical features to the centroids of each of the clusters of historical features. If the distance from the intervening text line's historical features to the closest centroid of a historical human text cluster is not much smaller than the distance to the closest centroid of a historical machine text cluster, then a probability exists that the intervening historical text line has been misclassified as human text, and therefore the intervening historical text line does not represent a break in the blocks of historical machine text. The probability of misclassification is based on the comparison of the distances from the potentially misclassified text line's historical features to the closest centroid of a historical human text cluster and the closest centroid of a historical machine text cluster. Consequently, if this probability of misclassification is greater than a probability threshold, the training post-processor module 322 reclassifies the intervening historical text line as machine text, and then can merge these contiguous blocks of historical text which are classified as machine text. A probability can be the likelihood of something happening or being the case. A probability threshold can be the likelihood of the magnitude that must be satisfied for a certain reaction, phenomenon, result, or condition to occur.

However, the determination as whether to merge the contiguous blocks of historical text which are classified as machine text or to keep these contiguous blocks of historical text separate may be based on whether these contiguous blocks of historical text are from the same source of machine text. The training post-processor module 322 can determine whether these contiguous blocks of historical text which are classified as machine text are from the same source of machine text by computing pairwise distances for pairs of historical text lines sampled from the contiguous blocks of historical text, and then comparing the distribution of the pairwise distances against a distribution of pairwise distances sampled from pairs of historical text lines where each historical text line belongs to only one of the contiguous blocks of historical text. The training post-processor module 322 can use a goodness-of-fit measure to infer if these contiguous blocks of historical text should be combined because they are from the same source of machine text, or if the contiguous blocks of historical text should remain separate because they are from different sources of machine text. Contiguous blocks can be sequential pieces of text that are processed as a unit. A same source can be an identical point of origin.

Even in cases where a block of historical text is classified as machine text, and does not include any intervening historical text line that is classified as human text, the training post-processor module 322 can determine whether the entire block of historical text that is classified as machine text is one type of machine text or is a heterogeneous block of historical text that should be broken into more cohesive blocks of machine text. For example, the training text detector module 320 classifies a heterogeneous block of historical text as machine text, and the heterogeneous block of historical text includes several historical text lines of a SQL query followed by several historical text lines of the SQL query's tabular output. If a system administrator specifies that only the historical text lines that are from a query should be highlighted in the system output, then the historical text lines from the query's tabular output should not be highlighted. Consequently, pairwise distances between the sets of historical features for consecutive historical text lines would deviate significantly once the transition is made from the last historical text line of a query to the first historical text line of the query's tabular output, based on the differences in the proportions of a set of historical features for a typical historical text line from a query and a set of historical features for a typical historical text line from the query's tabular output. The training post-processor module 322 can use the same approach to distinguish between application logs, error messages, stack traces, JSON configurations, code samples, code fragments, command-line arguments, and machine related configuration information.

Once the system 300 is trained, the trained system 300 may be deployed in a production setting to analyze either complete documents of new text or streams of new text. The production server 314 receives a block of text. For example, the production server 314 receives the block of text 200, that concerns another remote mount problem and is depicted by FIG. 2A, which includes human text that is interleaved with machine text. The block of text may include any number of application logs, error messages, stack traces, JSON configurations, code samples, code fragments, command-line arguments, and/or machine related configuration information from any time period. Text can be data that is in the form of characters.

After receiving a block of text, the production server 314 identifies delimiters in the block of text. For example, the production pre-processor module 324 can identify newline characters in the block of text 200 depicted by FIG. 2A. Following the identification of the delimiters, the production server 314 can split the block of text, at the delimiters, into a set of text lines. For example, the production pre-processor module 324 splits the block of text 200 into five text lines. The first text line is "I was trying to perform a remote mount and received the following error message:" and the second text line is "nfs_mount: host2 not responding: rpc prog not registered." The third text line is "Your mount command got to the port mapper, but the nfs mountd daemon was not registered. Log in to the server and use the ls command to verify that the /usr/sbin/mountd file exists. If this file exists, use the ps command to verify that the mountd daemon is running. If this daemon is not running, restart it by entering the following command," the fourth text line is "# /usr/sbin/mountd," and the fifth text line is "Please let me know if you need more help." A text line can be a horizontal sequence of data that is in the form of characters.

Having split the block of text into a set of text lines, the production server 314 determines whether any text line in the set of text lines is any type of excluded content. For example, the production pre-processor module 324 uses Shannon entropy with a threshold cutoff to determine that none of the five text lines is a low information line. After determining whether any text line in the set of text lines is any type of excluded content, the production server 314 deletes any text lines that are determined to be any type of excluded content from the set of text lines. For example, the production pre-processor module 324 does not need to delete any text lines because the Shannon entropy determined that none of the five text lines is a low information text line.

Following the deletion of any type of excluded content, the production server 314 creates a corresponding set of features for each text line in the set of text lines. For example, the production text detector module 326 receives the set of text lines, and then creates the sets of features 202 that are depicted by FIG. 2B. The sets of features 202 indicate that the first text line has 80 characters, which include 0 numerical characters, 1 uppercase character, 13 space characters, and 1 punctuation character, and the second text line has 56 characters, which include 1 numerical character, 0 uppercase characters, 7 space characters, and 3 punctuation characters The sets of features 202 also indicate that the third text line has 346 characters, which include 0 numerical characters, 4 uppercase characters, 64 space characters, and 9 punctuation characters, the fourth text line has 19 characters, which include 0 numerical characters, 0 uppercase characters, 2 space characters, and 4 punctuation characters, and the fifth text line has 41 characters, which include 0 numerical characters, 1 uppercase character, 8 space characters, and 1 punctuation character. A feature can be a distinctive attribute of something.

Having created sets of features, the production server 314 can create a features matrix by normalizing each set of features based on a total number of characters in the corresponding text line. The features matrix includes a row for each text line and a column for each feature in the set of features. For example, the production text detector module 326 creates the features matrix 204 that is depicted by FIG. 2C. The features matrix 204 indicates that the first text line has 0% numerical characters, 1% uppercase characters, 16% space characters, and 1% punctuation characters, and the second text line has 2% numerical characters, 0% uppercase characters, 13% space characters, and 5% punctuation characters. The features matrix 204 also indicates that the third text line has 0% numerical characters, 1% uppercase characters, 18% space characters, and 3% punctuation characters, the fourth text line has 0% numerical characters, 0% uppercase characters, 11% space characters, and 21% punctuation characters, and the fifth text line has 0% numerical characters, 2% uppercase characters, 20% space characters, and 2% punctuation characters.

After creating a features matrix, the production server 314 applies the trained machine-learning model to the features matrix, thereby clustering the sets of features corresponding to each text line into clusters of features based on similarities within the sets of features. For example, the production text detector module 326, which is a sufficiently trained version of the training text detector module 320, applies a K-means clustering algorithm to the features matrix 204, which clusters the features in the features matrix 204 into clusters of features based on similarities of the features, as partially illustrated by the graph 206 depicted by FIG. 2D. The reason that the graph 206 only partially illustrates the clustering of the features in the features matrix 204 is because the graph 206 has only three axes, a % uppercase axis, a % space axis, and a % punctuation axis, whereas a full illustration of the clusters of features would also require a fourth axis for % numerical. However, understanding three types of features that are measured along three axes that represent three dimensions in a black and white image on a two dimensional piece of paper is challenging enough for a reader, such that the addition of a fourth type of feature that is measured along a fourth axis that represents a fourth dimension may result in an image that is virtually impossible for the reader to understand.

Following the clustering of the sets of features, the production server 314 assigns a unique cluster identifier to each cluster of features and to each corresponding text line. For example, the production text detector module 326 creates a cluster of features that includes the features in the features matrix 204 for the first text line, the third text line, and the fifth text line, and then assigns the cluster number 1 to this cluster and to the first text line, the third text line, and the fifth text line. In another example, the production text detector module 326 creates a cluster of features that includes the features in the features matrix 204 for the second text line and the fourth text line, and then assigns the cluster number 2 to this cluster and to the second text line and the fourth text line.

In the example of the graph 206 depicted by FIG. 2D, the features for the second text line may superficially appear to be relatively close to the features for the first text line, the third text line, and the fifth text line. However, when the training text detector module 320 learned to create clusters of features, the frequent presence of uppercase characters in human text features and the frequent absence of uppercase characters in machine text features taught the production text detector module 326 to cluster the features for the second text line with the features for the fourth text line instead of clustering the features for the second text line with the features for the first text line, the third text line, and the fifth text line.

Having assigned a unique cluster identifier to each cluster of features and to each corresponding text line, the production server 314 identifies at least one of the clusters of features as corresponding to human text. This identification may be achieved in any of the following ways.

The production server 314 can identify the cluster of features that correspond to the largest number of text lines as corresponding to human text. For example, the production text detector module 326 identifies cluster number 1 that corresponds to three of the five text lines as corresponding to human text because the majority of the text lines in typical blocks of text for technical support tickets is human text.

Alternatively, the production server 314 can apply the machine learning model to the features of known human text lines to temporarily update the clusters of features and then identify the temporarily updated cluster of features to which the largest number of these features of these known human text lines were clustered as the cluster of features that corresponds to human text. For example, the production text detector module 326 applies the K-means clustering algorithm to the known human text line "This is a test," and then identifies that the features for "This is a test." would have been clustered to cluster number 1, which infers that cluster number 1 corresponds to human text. Since the features for the known human text lines were clustered only for the purposes of identifying (or verifying) which cluster corresponds to human text, the clusters are only temporarily updated, such that the features for the known human text line is not retained by the clusters and the known human text line is not used for subsequent human text analysis.

The production text detector module 326 can identify a cluster of features as corresponding to human text by examining proportions of human words corresponding to each cluster of features, and then identifying the cluster of features that correspond to the largest proportion of human words as corresponding to human text. For example, the production text detector module 326 examines the proportions of common human words such as "I" and "your," which were sampled from a Basic English vocabulary, in cluster number 1 and cluster number 2, and then identifies cluster number 1 which corresponds to one instance of "I" and one instance of "your" as corresponding to human text, because cluster number 1's proportion is 2% common human words based on a proportion of two common human words to eighty-five total words. In contrast, the production text detector module 326 identifies cluster number 2 which does not correspond to either "I" or "your" as corresponding to machine text, because cluster number 2's proportion is 0% common human words based on a proportion of no common human words to ten total words.

Having identified all clusters of features that correspond to human text, the production text detector module 326 classifies each text line that corresponds to the identified cluster of features as human text, and/or each text line that corresponds to another one of the clusters of features as machine text. For example, the production text detector module 326 classifies the first text line, the third text line, and the fifth text line as human text because the first text line, the third text line, and the fifth text line correspond to cluster number 1 that has been identified as corresponding to human text. In another example, the production text detector module 326 classifies the second text line and the fourth text line as machine text because the second text line and the fourth text line correspond to cluster number 2 that has not been identified as corresponding to human text.

In addition, the production server 314 enables multiple ways for configurable stringency in determining whether or not a text line is classified as machine text. For example, the production text detector module 326 can compute the distance of all sets of features for all text lines which are classified as machine text from the centroid(s) of the human text cluster(s) and the distance of the same sets of features from the centroid(s) of the machine text cluster(s). The production server 314 can confirm that a subset of text lines which correspond to sets of features that are closer than a pre-specified threshold distance from the centroid(s) of the machine text cluster(s) were correctly classified as machine text. However, if a text line corresponds to a set of features that is an outlier which is only marginally closer to a centroid of the machine text cluster(s) than to a centroid of the human text cluster(s), the text line could be classified as either machine text or human text, depending on the configurations by a system administrator. Consequently, a system administrator can configure whether a text line will be classified as machine text or human text if the distances of the text line's set of features to both types of centroids are within a distance threshold.

The production server 314 can classify a wide variety of machine text that includes application logs, error messages, stack traces, JSON configurations, code samples, code fragments, command-line arguments, and machine related configuration information. While diverse machine texts are relevant in assessing case health along different axes, highlighting all of the types of machine text may not be relevant to all members of a technical support organization. Accordingly, specific text lines that are classified as machine text may be reclassified by a system administrator as human text if needed. In this situation, the production server 314 can receive a whitelist that identifies specific types of text lines, which would have been classified as machine text, and then reclassify the specified types of text lines as human text. The system administrator can subsequently instruct the production server 314 to remove certain reclassifications from the whitelist or add other specific reclassifications to the whitelist, and then retrain the production text detector module 326 to ensure classification of various types of text lines in the manner desired by the system administrator. The production pre-processor module 324 can also apply the whitelist.

After the production text detector module 326 classifies each text line as either human text or machine text, rather than just outputting these classification results, the production post-processor module 328 can identify contiguous text lines that are classified as machine text and then use the start and stop characters for these contiguous text lines in the block of text when outputting the text. However, real-world environments frequently provide complications. For example, two blocks of text that are classified as machine text may be separated by an empty text line or by a text line that is classified as human text. In situations when two disjoint blocks of machine text are from different sources of machine text, or when the intervening text line is actually a human text, combining the blocks of machine text may not be desirable. In scenarios when the intervening text line between two blocks of machine text is misclassified as human text, the production post-processor module 328 should combine the two blocks of machine text with the misclassified intervening text line.

For such scenarios, the production post-processor module 328 builds blocks of machine text from contiguous or nearly contiguous text lines, by taking a wider view of the output from the production text detector module 326, and making a determination as whether to merge the blocks of text classified as machine text that are interleaved with text lines misclassified as human text or to keep the blocks of text classified as machine text separate. When two blocks of text that are classified as machine text and are separated by one, a couple, or a few intervening text lines that are classified as human text, the production post-processor module 328 can apply additional scrutiny to these intervening text lines to increase the confidence that these intervening text lines should be classified as human text. The production post-processor module 328 can compare the distance from an intervening text line's features to the centroids of each of the clusters of features. If the distance from the intervening text line's features to the closest centroid of a human text cluster is not much smaller than the distance to the closest centroid of a machine text cluster, then a probability exists that the intervening text line has been misclassified as human text, and therefore the intervening text line does not represent a break in the blocks of machine text. The probability of misclassification is based on the comparison of the distances from the potentially misclassified text line's features to the closest centroid of a human text cluster and the closest centroid of a machine text cluster. Consequently, if this probability of misclassification is greater than a probability threshold, the production post-processor module 328 reclassifies the intervening text line as machine text, and then can merge these contiguous blocks which are classified as machine text.

However, the determination as whether to merge the contiguous blocks of text which are classified as machine text or to keep these contiguous blocks of text separate may be based on whether these contiguous blocks of text are from the same source of machine text. The production post-processor module 328 can determine whether these contiguous blocks of text which are classified as machine text are from the same source of machine text by computing pairwise distances for pairs of text lines sampled from the contiguous blocks of text, and then comparing the distribution of the pairwise distances against a distribution of pairwise distances sampled from pairs of text lines where each text line belongs to only one of the contiguous blocks of text. The production post-processor module 328 can use a goodness-of-fit measure to infer if these contiguous blocks of text should be combined because they are from the same source of machine text, or if the contiguous blocks of text should remain separate because they are from different sources of machine text.

Even in cases where a block of text is classified as machine text, and does not include any intervening text that is classified as human text, the production post-processor module 328 can determine whether the entire block of text that is classified as machine text is one type of machine text or is a heterogeneous block of machine text that should be broken into more cohesive blocks of machine text. For example, the production text detector module 326 classifies a heterogeneous block of text as machine text, and the heterogeneous block of text includes several text lines of a SQL query followed by several text lines of the SQL query's tabular output. If a system administrator specifies that only the text lines that are from a query should be highlighted in the system output, then the text lines from the query's tabular output should not be highlighted. Consequently, pairwise distances between the sets of features for consecutive text lines would deviate significantly once the transition is made from the last text line of a query to the first text line of the query's tabular output, based on the differences in the proportions of a set of features for a typical text line from a query and a set of features for a typical text line from the query's tabular output. The production post-processor module 328 can use the same approach to distinguish between application logs, error messages, stack traces, JSON configurations, code samples, code fragments, command-line arguments, and machine related configuration information.

The trained system 300 may be reconfigured or periodically re-trained to incorporate changes in the underlying text being processed. This adaptive nature of the system 300 thus lends itself to usage in a wide variety of business domains. This automated unsupervised machine learning technique eliminates the requirement for labelled data and significantly improves the accuracy of text classification at the decision boundary. As opposed to a rules-based system, this unsupervised and supervised approach allows for a flexible, automated thresholding mechanism to separate the two classes of machine text and human text based on decision boundaries inferred from the data processed by the system 300.

After the classifying each text line as either human text or machine text, the production text detector module 326 applies human text analysis to each text line classified as human text and/or applies machine text analysis to each text line classified as machine text. Human text analysis can be the detailed examination of a set of characters, in which the majority of the characters combine to form natural language elements. Machine text analysis can be the detailed examination of a set of characters in which the minority of the characters combine to form natural language elements.

In a technical support ticket environment, the trained system 300 may be configured to make the process more efficient for the technical support agent as well as more useful for the end user. For example, a technical support agent may reference a knowledge base article as recommended reading for an end user in the course of handling a troubleshooting case. The trained system 300 can augment this process by powering a recommendation engine that maps specific text lines that are classified as machine text to their corresponding knowledge base articles. Consequently, for every troubleshooting case that includes any of the specific type of machine text lines that maps to any knowledge base articles, the trained system 300 can provide the technical support agent working on the case with a list of recommended knowledge base articles generated by a recommendation engine that is powered by the trained system 300.

From a customer satisfaction standpoint, the trained system 300 enables software companies to get fine-grained technical information regarding their customer's problems. For example, when the trained system 300 extracts information such as a device identifier from blocks of text, the software company can assess if problems are occurring with a specific machine or a specific cluster of machines on the customer's side. Machine learning models such as problem escalation predictors can derive information from machine text. For example, the trained system 300 can identify a Webex call based on its uniform resource locator in a block of machine text, which indicates that the technical support agent is addressing the needs of the customer. Identifying a scheduled Webex call could alter a machine learning model's prediction of problem escalation for a given troubleshooting case. In another example, the trained system 300 can identify application log files attached by a customer as a single text line of machine text that usually ends with a ".ZIP," which indicates that the customer attached some information. This identification of provided information can help quantify the amount of information the technical support agent requested and received from a customer, and the weighing of this amount of information against the total time for which a troubleshooting case has been open may be an indicator of poor case health and an indicator of an impending escalation.

When evaluating a specific product's performance, a software company can extract issues faced by multiple customers from text that pertain to the specific product. For example, when a specific product is known to have a problem, several technical support tickets will contain technical content that reflect error messages generated for the specific product, regardless of which customers used the specific product. The analysis of this technical content can allow the software company to prioritize and channel engineering resources to address the problem, and to use the analyzed content as a derived metric in evaluating the specific product's performance for business-focused decisions.

Keywords extracted from machine text can capture the essence of what a technical support ticket is truly about. Information extracted from these keywords can provide diagnostic value and summarize a case effectively. This extracted information can augment a technical support manager's decision around assigning a troubleshooting case to the technical support agent who is best qualified for the specific case. The trained system 300 is flexible and can analyze outbound comments, which are generated by the technical support agent, and/or inbound comments, which are generated by the end-user. From a technical support agent's point of view, analyzing the machine text in the context of the outbound comments generated by the technical support agent can provide valuable insights. For example, detecting an application log message fragment in an outbound comment can provide a succinct view of the technical support agent's diagnoses of the problem.

Further analysis may be undertaken of the composition of the clusters of features that are classified as machine text. In many instances, these clusters of features will represent different forms of machine text, allowing a finer grain classification of the machine text. Additional text detector modules may be deployed to further guide this sub-classification of types of machine text. The user interface rendering of a technical support ticket may be improved by appropriately highlighting, coloring, and formatting the various types of machine text within the context of troubleshooting case discussions.

Technical support portals have forms that enable end users to submit information about a troubleshooting case. The production text detector module 326 combined with a component that identifies the type of machine text as an application log, error message, stack trace, JSON configuration, code sample, code fragment, command-line argument, or machine related configuration information, can help warn an end user if the end user is copying or pasting the wrong information into the portal's form. For example, if the end user's human text refers to code samples but the end user copies and pastes application log messages into the portal form, the trained system 300 can alert the end user of this mismatch between types of machine text before the end user submits the portal form.

Machine text detection can also be used for compliance, audit checks, and masking sensitive information. For example, application logs and error messages can contain sensitive information such as internet protocol addresses, server names, usernames, and passwords that the trained system 300 can identify and mask. The trained system 300 can separate human text from machine text and apply a sentiment analysis engine or other refined natural language processing engines to the human text for further feature extraction steps.

Since the trained system 300 harnesses differences in statistical regularity between human text and machine text, these differences may be tailored to different domains, expanding the scope of its usage. For example, the trained system 300 can analyze not just technical support tickets, but engineering tickets, information technology forms, as well as other non-information technology fields that may interleave machine text with human text, such as manufacturing industries and health care.

Figure 4A:
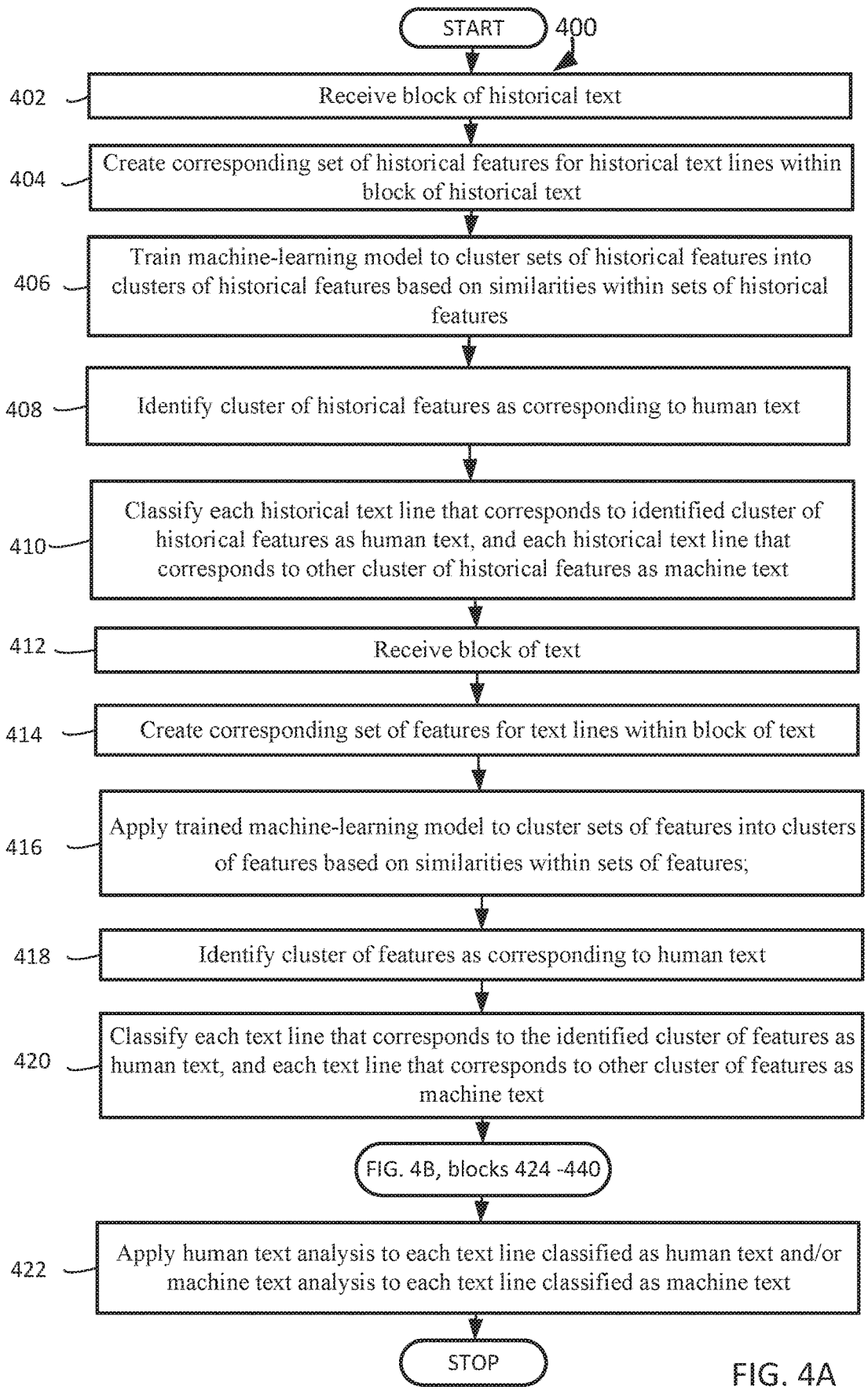
FIGS. 4A-B are a flowchart that illustrates a computer-implemented method for detecting machine text, under an embodiment.
Figure 4B:
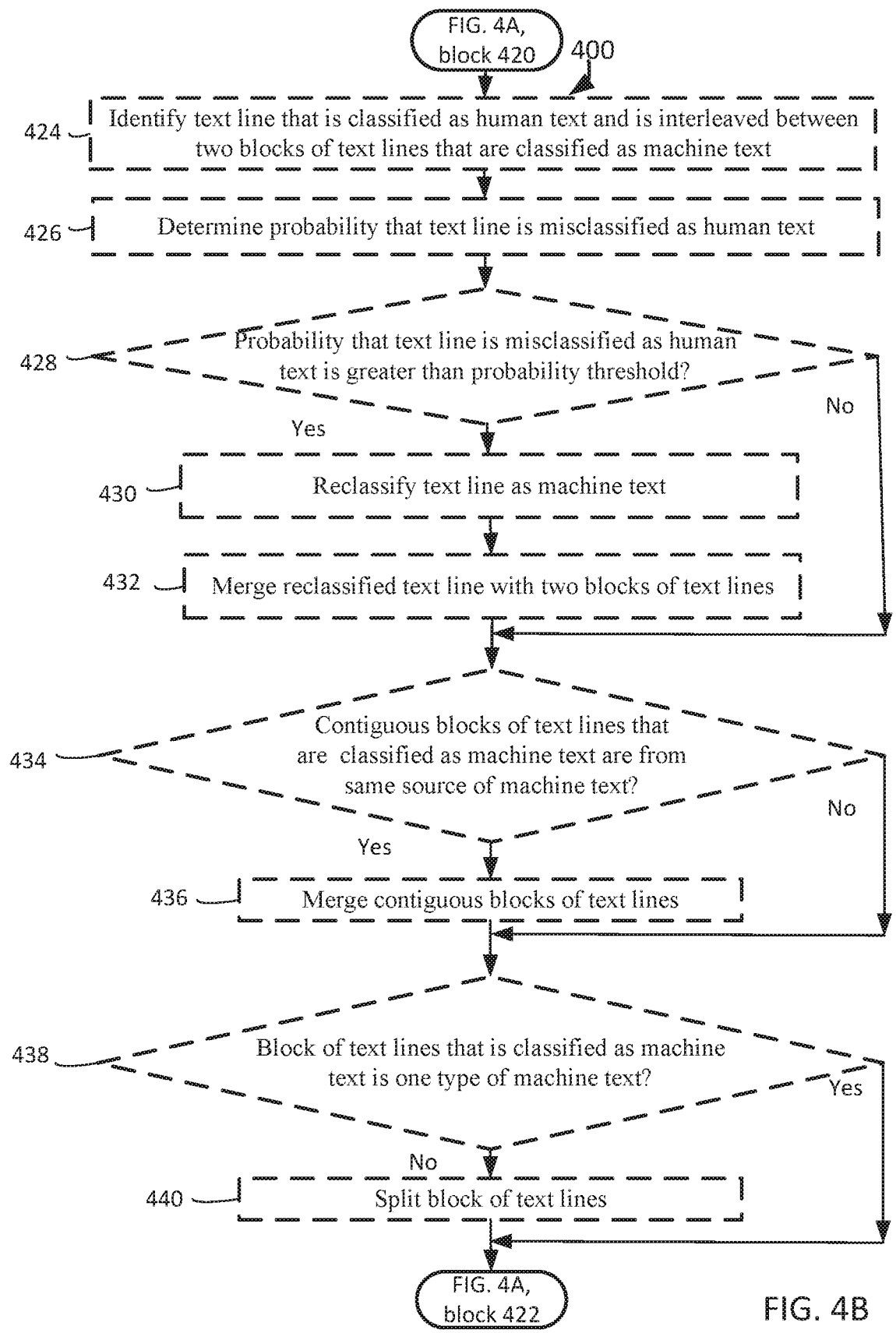

FIG. 4 is a flowchart that illustrates a computer-implemented method for detecting machine text, under an embodiment. Flowchart 400 depicts method acts illustrated as flowchart blocks for certain actions involved in and/or between the system elements 302-328 of FIG. 3.

A block of historical text is received, block 402. The system 300 initializes processing with historical documents and/or streams of text. For example, and without limitation, this may include the training server 312 receiving the block of text 100 concerning a remote mount problem, as depicted by FIG. 1A.

After receiving a block of historical text, a corresponding set of historical features is created for historical text lines within the block of historical text, block 404. The system 300 creates a features matrix for the historical text lines in the historical text block. By way of example and without limitation, this may include the training text detector module 320 creating the sets of features 102 for text lines within the block of text 100, in which the sets of features 102 indicate a count of 94 characters that include 17 spaces in the first text line, as depicted by FIG. 1B, and then normalizing these sets of features 102 in the features matrix 104, which indicates that 18% of the first text line's characters are spaces, as depicted by FIG. 1C.

Following the creation of the features matrix, a machine-learning model is trained to cluster the sets of historical features corresponding to the historical text lines into clusters of historical features based on similarities within the sets of historical features, block 406. The system 300 trains to cluster features for human text and machine text. In embodiments, this may include the training server 312 training the training text detector module 320 to cluster the features in the features matrix 104 into clusters of features based on similarities of the features, as partially illustrated by the graph 106 depicted by FIG. 1D.

Having created clusters of historical features, a cluster of historical features is identified as corresponding to human text, block 408. The system 300 identifies a human text cluster. For example, and without limitation, this may include the training text detector module 320 identifying cluster number 1 that corresponds to three of the five non-blank historical text lines as corresponding to human text because the majority of the historical text lines in typical blocks of text for technical support tickets is human text, After identifying a historical features cluster that corresponds to human text, each historical text line that corresponds to the identified cluster of historical features is classified as human text, and/or each historical text line that corresponds to another cluster of historical features is classified as machine text, block 410. The system 300 classifies each historical text lines as human text or machine text. By way of example and without limitation, this may include the training text detector module 320 classifying the first, fifth and sixth text lines that correspond to cluster number 1 as human text, and classifying the third and seventh text lines that correspond to the remaining cluster number 2 as machine text.

Following the training of the machine learning model, a block of text is received, block 412. The system 300 initializes processing with new production documents and/or streams of text. In embodiments, this may include the production server 314 receiving the current block of text 200 concerning a different remote mount problem, as depicted by FIG. 2A.

Having received a block of text, a corresponding set of features is created for text lines within the block of text, block 414. The system 300 creates a features matrix for the text lines in the text block. For example, and without limitation, this may include the production text detector module 326 creating the sets of features 202 for text lines within the block of text 200, in which the sets of features 202 indicate a count of 80 characters that include 13 spaces in the first text line, as depicted by FIG. 2B, and normalizing these features in the features matrix 204, which indicates that 16% of the first text line's characters are spaces, as depicted by FIG. 2C.

After the creation of the features matrix, the trained machine-learning model is applied to cluster the sets of features corresponding to the text lines into clusters of features based on similarities within the sets of features block 416. The system 300 clusters features for human text and machine text. By way of example and without limitation, this may include the production server 314 applying the production text detector module 326 to cluster the features in the features matrix 204 into clusters of features based on similarities of the features, as partially illustrated by the graph 206 depicted by FIG. 2D.

Following the creation of clusters of features, a cluster of features is identified as corresponding to human text block 418. The system 300 identifies a human text cluster. In embodiments, this may include the production text detector module 326 identifying cluster number 1 that corresponds to three of the five historical text lines as corresponding to human text because the majority of the historical text lines in typical blocks of text for technical support tickets is human text.

Having identified a features cluster as corresponding to human text, each text line that corresponds to the identified cluster of features is classified as human text, and/or each text line that corresponds to another cluster of features is classified as machine text, block 410. The system 300 classifies each of the historical text lines as human text or machine text, block 420. For example, and without limitation, this may include the production text detector module 326 classifying the first, third, and fifth text lines that correspond to cluster number 1 as human text, and also classifying the second and fourth text lines that corresponds to the remaining cluster number 2 as machine text.

After classifying each text line as human text or machine text, the method 400 proceeds to optionally execute the blocks 424-440. Following any optional execution of the blocks 424-440, the method 400 returns to execute the block 422.

Having classified each text line as human text or machine text, human text analysis is applied to each text line classified as human text and/or machine text analysis is applied to each text line classified as machine text, block 422. The system 300 analyzes the machine text lines as machine text and the human text lines as human text. By way of example and without limitation, this may include the production server 314 analyzing the first, third, and fifth text lines as human text and analyzing the second and fourth text lines as machine text. Then the method 400 terminates.

After classifying each text line as human text or machine text, an optional identification is made of a text line which is classified as human text and is interleaved between two blocks of text lines that are classified as machine text, block 424. The system 300 identifies text lines that are possibly misclassified as human text. In embodiments, this may include the production post-processor module 328 identifying the text line "Kernel IP routing table" that is classified as human text and is interleaved between a first block of text lines that introduces an error message and is classified as machine text and a second block of text lines that includes routing table data and is classified as machine text.

Having identified a possibly misclassified text line, a probability is optionally determined that the text line is misclassified as human text, block 426. The system 300 determines the probability that the text line is misclassified. For example, and without limitation, this may include the production post-processor module 328 calculating a 45% misclassification probability based on comparing the distance from the intervening text line's features to the centroids of each of the clusters of features.

After determining the misclassification probability, a determination is optionally made whether the probability that the text line is misclassified as human text is greater than a probability threshold, block 428. The system 300 evaluates the misclassification probability. By way of example and without limitation, this may include the production post-processor module 328 determining whether the 45% misclassification probability is greater than the 40% misclassification probability threshold. If the probability that the text line is misclassified as human text is greater than the probability threshold, the method 400 continues to block 430 to reclassify the text line as machine text. If the probability that the text line is misclassified as human text is not greater than the probability threshold, the method 400 proceeds to block 434 to evaluate contiguous blocks of machine text.

If the probability that the text line is misclassified as human text is greater than the probability threshold, the text line is optionally reclassified as machine text, block 430. The system 300 reclassifies the misclassified and intervening text line as machine text. In embodiments, this may include the production post-processor module 328 reclassifying the intervening text line "Kernel IP routing table" as machine text because the 45% misclassification probability is greater than the 40% misclassification probability threshold.

Following the reclassification of the intervening text line, the reclassified text line is optionally merged with the two blocks of text lines, block 432. The system 300 merges the intervening text line that has been reclassified as machine text with the surrounding blocks of machine text. For example, and without limitation, this may include the production post-processor module 328 merging the intervening text line "Kernel IP routing table" that is reclassified as machine text between the first block of text lines that introduces the error message and is classified as machine text and the second block of text lines that includes routing table data and is classified as machine text.

After classifying each text line as human text or machine text, a determination is optionally made whether contiguous blocks of text lines that are classified as machine text are from a same source of machine text, block 434. The system 300 determines if contiguous blocks of machine text should be merged. By way of example and without limitation, this may include the production post-processor module 328 determining whether a first contiguous block of text which is classified as machine text, a second contiguous block of text which was classified as human text and then reclassified as machine text, and a third contiguous block of text which is classified as machine text are from the same source of machine text. The production post-processor module 328 computes pairwise distances for pairs of text lines sampled from the first and third contiguous blocks of text, and then compares the distribution of the pairwise distances against a distribution of pairwise distances sampled from pairs of text lines where each text line belongs to only the first or the third of the contiguous blocks of text. The training post-processor module 322 uses a goodness-of-fit measure to infer if these contiguous blocks of text are from the same source of machine text. If the contiguous blocks of text lines that are classified as machine text are from a same source of machine text, the method 400 continues to block 436 to merge the blocks. If the contiguous blocks of text lines that are classified as machine text are not from a same source of machine text, the method 400 proceeds to block 438 to evaluate a block of machine text.

If the contiguous blocks of text lines that are classified as machine text are from a same source of machine text, the contiguous blocks of text lines are optionally merged, block 436. The system 300 merges contiguous blocks of machine text from the same source. In embodiments, this may include the production post-processor module 328 merging the first, second and third contiguous blocks of machine text because the first and third blocks are from the same error message generator and the second block is an error message description that was initially misclassified as human text.

After classifying each text line as human text or machine text, whether a block of text lines that is classified as machine text is one type of machine text is optionally determined, block 438. The system 300 determines if a block of machine text should be split. By way of example and without limitation, this may include the production post-processor module 328 classifying a heterogeneous block of text as machine text, and the heterogeneous block of text includes several text lines of a SQL query followed by several text lines of the SQL query's tabular output. Since a system administrator specifies that only the text lines that are from a query should be highlighted in the system output, then the text lines from the query's tabular output should not be highlighted. Consequently, the production post-processor module 328 computes pairwise distances between the sets of features for consecutive text lines, and the distances deviate significantly once the transition is made from the last text line of the query to the first text line of the query's tabular output, based on the differences in the proportions of the features for the query's text lines and the features for the query's tabular output text lines. If the block of text lines that is classified as machine text is not one type of machine text, the method 400 continues to block 440 to split the block. If the block of text lines that is classified as machine text is one type of machine text, the method 400 continues to block 422.

If the block of text lines that is classified as machine text is not one type of machine text, the block of text lines is optionally split, block 440. The system 300 splits blocks of different types of machine text. In embodiments, this may include the production post-processor module 328 splitting the block of text that includes several text lines of the SQL query from the block of text that includes several text lines of the SQL query's tabular output.

Although FIG. 4 depicts the blocks 402-440 occurring in a specific order, the blocks 402-440 may occur in another order. In other implementations, each of the blocks 402-440 may also be executed in combination with other blocks and/or some blocks may be divided into a different set of blocks.

Figure 5:
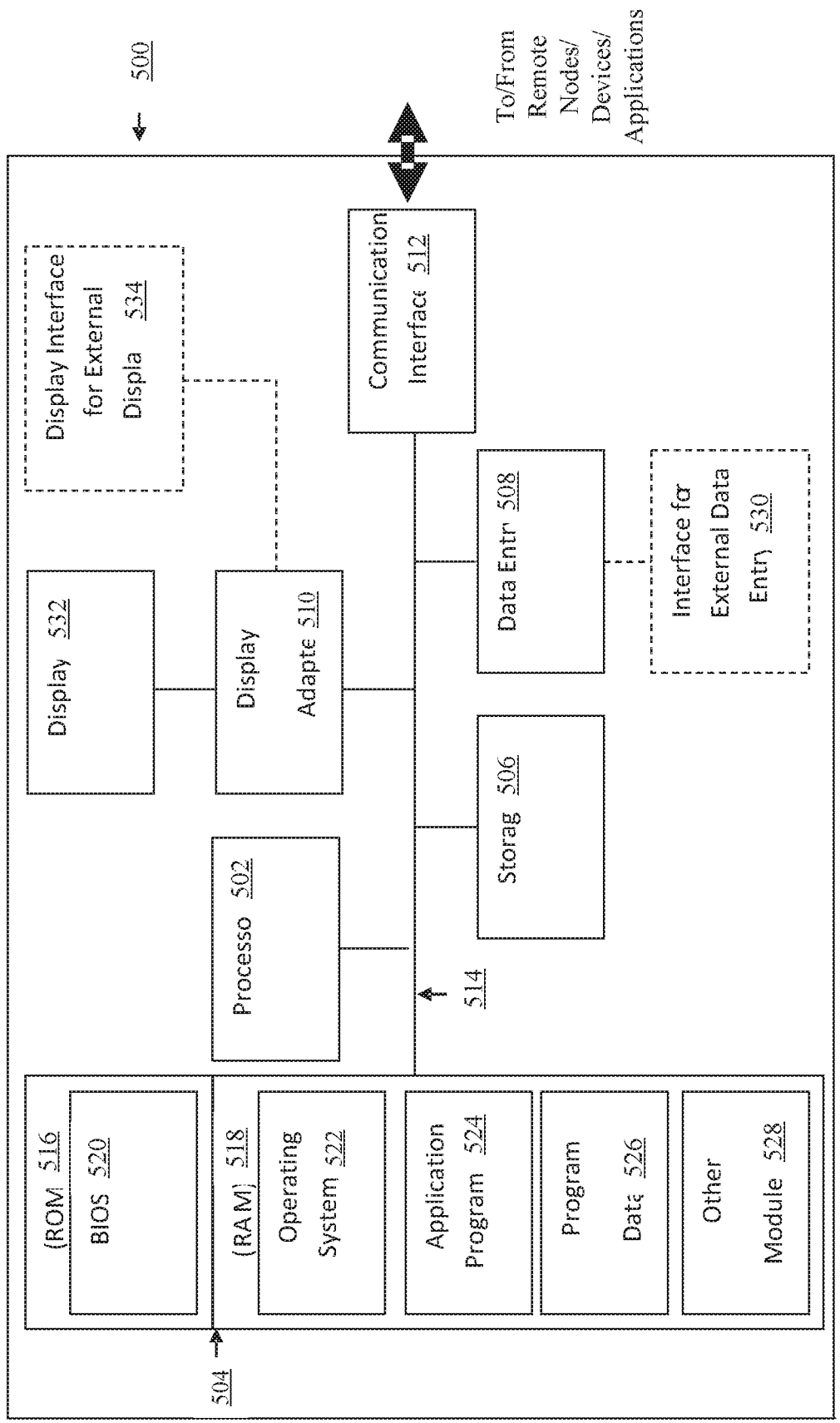
FIG. 5 is a block diagram illustrating an example hardware device in which the subject matter may be implemented.

In exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, a memory 504, a storage 506, a data entry module 508, a display adapter 510, a communication interface 512, and a bus 514 that couples elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include a read only memory (ROM) 516 and a random access memory (RAM) 518. The memory 504 may be configured to store program instructions and data during operation of the hardware device 500. In various embodiments, the memory 504 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which may store data that is accessible by a computer, such as magnetic cassettes, flash memory cards, digital video disks, Bernoulli cartridges, RAM, ROM, and the like may also be used in the exemplary operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through data entry module 508. The data entry module 508 may include mechanisms such as a keyboard, a touch screen, a pointing device, etc. Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via the external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter may also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for detecting machine text, the system comprising one or more processor and a non-transitory computer readable medium storing a plurality of instructions, which when executed, cause the one or more processors to:
   create a corresponding set of historical features for historical text lines within a block of historical text, in response to receiving the block of historical text;
   train a machine-learning model to cluster the sets of historical features into clusters of historical features based on similarities within the sets of historical features; identify one of the clusters of historical features as corresponding to human text;
   classify each historical text line that corresponds to the identified cluster of historical features as human text, and each historical text line that corresponds to another one of the clusters of historical features as machine text;
   create a corresponding set of features for text lines within a block of text generated by either of a first human and a second human, in response to receiving the block of text;
   apply the trained machine-learning model to cluster the sets of features into clusters of features based on similarities within the sets of features;
   identify one of the clusters of features as corresponding to human text; classify each text line that is within the block of text and which corresponds to the identified cluster of features as human text generated by either of the first human and the second human,
   and each text line that is interleaved with the classified human text within the block of text and which corresponds to another one of the clusters of features as machine text inserted by either of the first human and the second human;
   and apply, human text analysis to each text line classified as human text generated by either of the first human and the second human and machine text analysis to each text line classified as machine text inserted by either of the first human and the second human.

2. The system of claim 1, wherein creating the corresponding set of historical features comprises identifying delimiters in the block of historical text, splitting the block of historical text at the delimiters into a set of historical text lines; determining whether any historical text line in the set of historical text lines comprises any type of excluded content, deleting any historical text lines that are determined to be any type of excluded content from the set of historical text lines, and creating a corresponding set of historical features for each historical text line in the set of historical text lines, wherein each set of historical features is normalized based on a total number of characters in a corresponding historical text line.

3. The system of claim 1, wherein identifying the cluster of historical features as corresponding to human text comprises performing at least one of a first set of acts and a second set of acts, the first set of acts comprising identifying a cluster of historical features that correspond to a largest number of historical text lines as corresponding to human text, applying the machine learning model to features of known human text lines to temporarily update the clusters of historical features and then identifying a temporarily updated cluster of historical features to which a largest number of the features of these known human text lines were clustered as the cluster of historical features that corresponds to human text, and the second set of acts comprising examining proportions of human words corresponding to each cluster of historical features and then identifying a cluster of historical features that corresponds to a largest proportion of the human words as corresponding to human text.

4. The system of claim 1, wherein creating the corresponding set of features comprises identifying delimiters in the block of text, splitting the block of text at the delimiters into a set of text lines; determining whether any text line in the set of text lines comprises any type of excluded content, deleting any text lines that are determined to be any type of excluded content from the set of text lines, and creating a corresponding set of features for each text line in the set of text lines, wherein each set of features is normalized based on a total number of characters in a corresponding text line.

5. The system of claim 1, wherein identifying the cluster of features as corresponding to human text comprises performing at least one of a first set of acts and a second set of acts, the first set of acts comprising identifying a cluster of features that correspond to a largest number of text lines as corresponding to human text, applying the machine learning model to features of known human text lines to temporarily update the clusters of features and then identifying a temporarily updated cluster of features to which a largest number of the features of these known human text lines were clustered as the cluster of features that corresponds to human text, and the second set of acts comprising examining proportions of human words corresponding to each cluster of features and then identifying a cluster of features that corresponds to a largest proportion of the human words as corresponding to human text.

6. The system of claim 1, comprising further instructions, which when executed, cause the one or more processors to:
   identify a text line that is classified as human text and is interleaved between two blocks of text lines that are classified as machine text;
   determine a probability that the text line is misclassified as human text;
   determine whether the probability that the text line is misclassified as human text is greater than a probability threshold;

reclassify the text line as machine text, in response to a determination that the probability that the text line is misclassified as human text is greater than the probability threshold; and merge the reclassified text line with the two blocks of text lines.

7. The system of claim 1, comprising further instructions, which when executed, cause the one or more processors to:

determine whether contiguous blocks of text lines that are classified as machine text are from a same source of machine text;

merge the contiguous blocks of text lines, in response to a determination that the contiguous blocks of text lines that are classified as machine text are from the same source of machine text;

determine whether a block of text lines that is classified as machine text is one type of machine text; and split the block of text lines that is classified as machine text, in response to a determination that the contiguous blocks of text lines that are classified as machine text is not one type of machine text.

8. A computer-implemented method for detecting machine text, the method comprising:

creating a corresponding set of historical features for historical text lines within a block of historical text, in response to receiving the block of historical text;

training a machine-learning model to cluster the sets of historical features into clusters of historical features based on similarities within the sets of historical features;

identifying one of the clusters of historical features as corresponding to human text;

classifying, each historical text line that corresponds to the identified cluster of historical features as human text, and each historical text line that corresponds to another one of the clusters of historical features as machine text;

creating a corresponding set of features for text lines within a block of text generated by either of a first human and a second human, in response to receiving the block of text;

applying the trained machine-learning model to cluster the sets of features into clusters of features based on similarities within the sets of features;

identifying one of the clusters of features as corresponding to human text;

classifying, each text line that is within the block of text and which corresponds to the identified cluster of features as human text generated by either of the first human and the second human, and each text line that is interleaved with the classified human text within the block of text and which corresponds to another one of the clusters of features as machine text inserted by either of the first human and the second human; and applying, human text analysis to each text line classified as human text generated by either of the first human and the second human and machine text analysis to each text line classified as machine text inserted by either of the first human and the second human.

9. The computer-implemented method of claim 8, wherein creating the corresponding set of historical features comprises identifying delimiters in the block of historical text, splitting the block of historical text at the delimiters into a set of historical text lines; determining whether any historical text line in the set of historical text lines comprises any type of excluded content, deleting any historical text lines that are determined to be any type of excluded content from the set of historical text lines, and creating a corresponding set of historical features for each historical text line in the set of historical text lines, wherein each set of historical features is normalized based on a total number of characters in a corresponding historical text line.

10. The computer-implemented method of claim 8, wherein identifying the cluster of historical features as corresponding to human text comprises performing at least one of a first set of acts and a second set of acts, the first set of acts comprising identifying a cluster of historical features that correspond to a largest number of historical text lines as corresponding to human text, applying the machine learning model to features of known human text lines to temporarily update the clusters of historical features and then identifying a temporarily updated cluster of historical features to which a largest number of the features of these known human text lines were clustered as the cluster of historical features that corresponds to human text, and the second set of acts comprising examining proportions of human words corresponding to each cluster of historical features and then identifying a cluster of historical features that corresponds to a largest proportion of the human words as corresponding to human text.

11. The computer-implemented method of claim 8, wherein creating the corresponding set of features comprises identifying delimiters in the block of text, splitting the block of text at the delimiters into a set of text lines; determining whether any text line in the set of text lines comprises any type of excluded content, deleting any text lines that are determined to be any type of excluded content from the set of text lines, and creating a corresponding set of features for each text line in the set of text lines, wherein each set of features is normalized based on a total number of characters in a corresponding text line.

12. The computer-implemented method of claim 8, wherein identifying the cluster of features as corresponding to human text comprises performing at least one of a first set of acts and a second set of acts, the first set of acts comprising identifying a cluster of features that correspond to a largest number of text lines as corresponding to human text, applying the machine learning model to features of known human text lines to temporarily update the clusters of features and then identifying a temporarily updated cluster of features to which a largest number of the features of these known human text lines were clustered as the cluster of features that corresponds to human text, and the second set of acts comprising examining proportions of human words corresponding to each cluster of features and then identifying a cluster of features that corresponds to a largest proportion of the human words as corresponding to human text.

13. The computer-implemented method of claim 8, the computer-implemented method further comprising:

identifying a text line that is classified as human text and is interleaved between two blocks of text lines that are classified as machine text;

determining a probability that the text line is misclassified as human text;

determining whether the probability that the text line is misclassified as human text is greater than a probability threshold;

reclassifying the text line as machine text, in response to a determination that the probability that the text line is misclassified as human text is greater than the probability threshold; and merging the reclassified text line with the two blocks of text lines.

14. The computer-implemented method of claim 8, the computer-implemented method further comprising:
- determining whether contiguous blocks of text lines that are classified as machine text are from a same source of machine text;
- merging the contiguous blocks of text lines, in response to a determination that the contiguous blocks of text lines that are classified as machine text are from the same source of machine text;
- determining whether a block of text lines that is classified as machine text is one type of machine text; and
- splitting the block of text lines that is classified as machine text, in response to a determination that the contiguous blocks of text lines that are classified as machine text is not one type of machine text.

15. A computer program product, comprising a non-transitory computer-readable medium having a computer-readable program code embodied therein to be executed by one or more processors, the program code including instructions to:
- create a corresponding set of historical features for historical text lines within a block of historical text, in response to receiving the block of historical text;
- train a machine-learning model to cluster the sets of historical features into clusters of historical features based on similarities within the sets of historical features;
- identify one of the clusters of historical features as corresponding to human text;
- classify, each historical text line that corresponds to the identified cluster of historical features as human text, and each historical text line that corresponds to another one of the clusters of historical features as machine text;
- create a corresponding set of features for text lines within a block of text generated by either of a first human and a second human, in response to receiving the block of text;
- apply the trained machine-learning model to cluster the sets of features into clusters of features based on similarities within the sets of features;
- identify one of the clusters of features as corresponding to human text;
- classify, each text line that is within the block of text and which corresponds to the identified cluster of features as human text generated by either of the first human and the second human, and each text line that is interleaved with the classified human text within the block of text and which corresponds to another one of the clusters of features as machine text inserted by either of the first human and the second human; and
- apply, human text analysis to each text line classified as human text generated by either of the first human and the second human and machine text analysis to each text line classified as machine text inserted by either of the first human and the second human.

16. The computer program product of claim 15, wherein creating the corresponding set of historical features comprises identifying delimiters in the block of historical text, splitting the block of historical text at the delimiters into a set of historical text lines; determining whether any historical text line in the set of historical text lines comprises any type of excluded content, deleting any historical text lines that are determined to be any type of excluded content from the set of historical text lines, and creating a corresponding set of historical features for each historical text line in the set of historical text lines, wherein each set of historical features is normalized based on a total number of characters in a corresponding historical text line.

17. The computer program product of claim 15, wherein identifying the cluster of historical features as corresponding to human text comprises performing at least one of a first set of acts and a second set of acts, the first set of acts comprising identifying a cluster of historical features that correspond to a largest number of historical text lines as corresponding to human text, applying the machine learning model to features of known human text lines to temporarily update the clusters of historical features and then identifying a temporarily updated cluster of historical features to which a largest number of the features of these known human text lines were clustered as the cluster of historical features that corresponds to human text, and the second set of acts comprising of human words corresponding to each cluster of historical features and then identifying a cluster of historical features that corresponds to a largest proportion of the human words as corresponding to human text.

18. The computer program product of claim 15, wherein creating the corresponding set of features comprises identifying delimiters in the block of text, splitting the block of text at the delimiters into a set of text lines; determining whether any text line in the set of text lines comprises any type of excluded content, deleting any text lines that are determined to be any type of excluded content from the set of text lines, and creating a corresponding set of features for each text line in the set of text lines, wherein each set of features is normalized based on a total number of characters in a corresponding text line.

19. The computer program product of claim 15, wherein identifying the cluster of features as corresponding to human text comprises performing at least one of a first set of acts and a second set of acts, the first set of acts comprising identifying a cluster of features that correspond to a largest number of text lines as corresponding to human text, applying the machine learning model to features of known human text lines to temporarily update the clusters of features and then identifying a temporarily updated cluster of features to which a largest number of the features of these known human text lines were clustered as the cluster of features that corresponds to human text, and the second set of acts comprising of human words corresponding to each cluster of features and then identifying a cluster of features that corresponds to a largest proportion of the human words as corresponding to human text.

20. The computer program product of claim 15, wherein the program code comprises further instructions to:
- identify a text line that is classified as human text and is interleaved between two blocks of text lines that are classified as machine text;
- determine a probability that the text line is misclassified as human text;
- determine whether the probability that the text line is misclassified as human text is greater than a probability threshold;
- reclassify the text line as machine text, in response to a determination that the probability that the text line is misclassified as human text is greater than the probability threshold;
- merge the reclassified text line with the two blocks of text lines;
- determine whether contiguous blocks of text lines that are classified as machine text are from a same source of machine text;

merge the contiguous blocks of text lines, in response to a determination that the contiguous blocks of text lines that are classified as machine text are from the same source of machine text;

determine whether a block of text lines that is classified as machine text is one type of machine text; and split the block of text lines that is classified as machine text, in response to a determination that the contiguous blocks of text lines that are classified as machine text is not one type of machine text.

* * * * *